(12) United States Patent
Kang et al.

(10) Patent No.: US 12,160,192 B2
(45) Date of Patent: Dec. 3, 2024

(54) MOTOR

(71) Applicant: LG INNOTEK CO., LTD., Seoul (KR)

(72) Inventors: Byeong Bae Kang, Seoul (KR); Yeon Won Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 18/021,936

(22) PCT Filed: Aug. 20, 2021

(86) PCT No.: PCT/KR2021/011123
§ 371 (c)(1),
(2) Date: Feb. 17, 2023

(87) PCT Pub. No.: WO2022/039554
PCT Pub. Date: Feb. 24, 2022

(65) Prior Publication Data
US 2023/0353077 A1  Nov. 2, 2023

(30) Foreign Application Priority Data

Aug. 20, 2020 (KR) .................. 10-2020-0104744

(51) Int. Cl.
*H02P 23/14* (2006.01)
*F01M 1/02* (2006.01)

(52) U.S. Cl.
CPC ............. *H02P 23/14* (2013.01); *F01M 1/02* (2013.01); *F01M 2001/0253* (2013.01)

(58) Field of Classification Search
CPC .......... H02P 23/14; H02P 29/60; H02P 21/22; H02P 21/14; F01M 1/02; F01M 2001/0253
See application file for complete search history.

(56) References Cited

U.S. PATENT DOCUMENTS

| 2011/0135499 A1 | 6/2011 | Lee et al. |
| 2015/0010408 A1 | 1/2015 | Kagawa et al. |
| 2022/0216819 A1* | 7/2022 | Prinzhorn ................ F01M 1/16 |

FOREIGN PATENT DOCUMENTS

| KR | 10-2010-0010544 A | 2/2010 |
| KR | 10-2012-0079865 A | 7/2012 |

(Continued)

OTHER PUBLICATIONS

Machine Translation of KR1785860B1 PDF File Name: "KR1785860B1_Machine_Translation.pdf".*

*Primary Examiner* — Grant Moubry
*Assistant Examiner* — Ruben Picon-Feliciano
(74) *Attorney, Agent, or Firm* — Birch, Stewart, Kolasch & Birch, LLP

(57) ABSTRACT

The present invention can provide a control device for a motor which supplies oil, the control device including a speed measurement unit which applies a maximum current to a motor to measure a first speed of the motor which corresponds to the maximum current, a temperature detection unit which detects a temperature of oil based on the first speed, a target current generation unit which generates a target current based on the detected temperature of the oil, the first speed, and a target speed, and a current control unit which controls a current to maintain the generated target current.

6 Claims, 5 Drawing Sheets

(56) References Cited

FOREIGN PATENT DOCUMENTS

| KR | 10-2014-0109908 A | 9/2014 | | |
|---|---|---|---|---|
| KR | 1785860 B1 | * | 10/2017 | ............... F01M 1/02 |
| KR | 10-2019-0136408 A | 12/2019 | | |

* cited by examiner

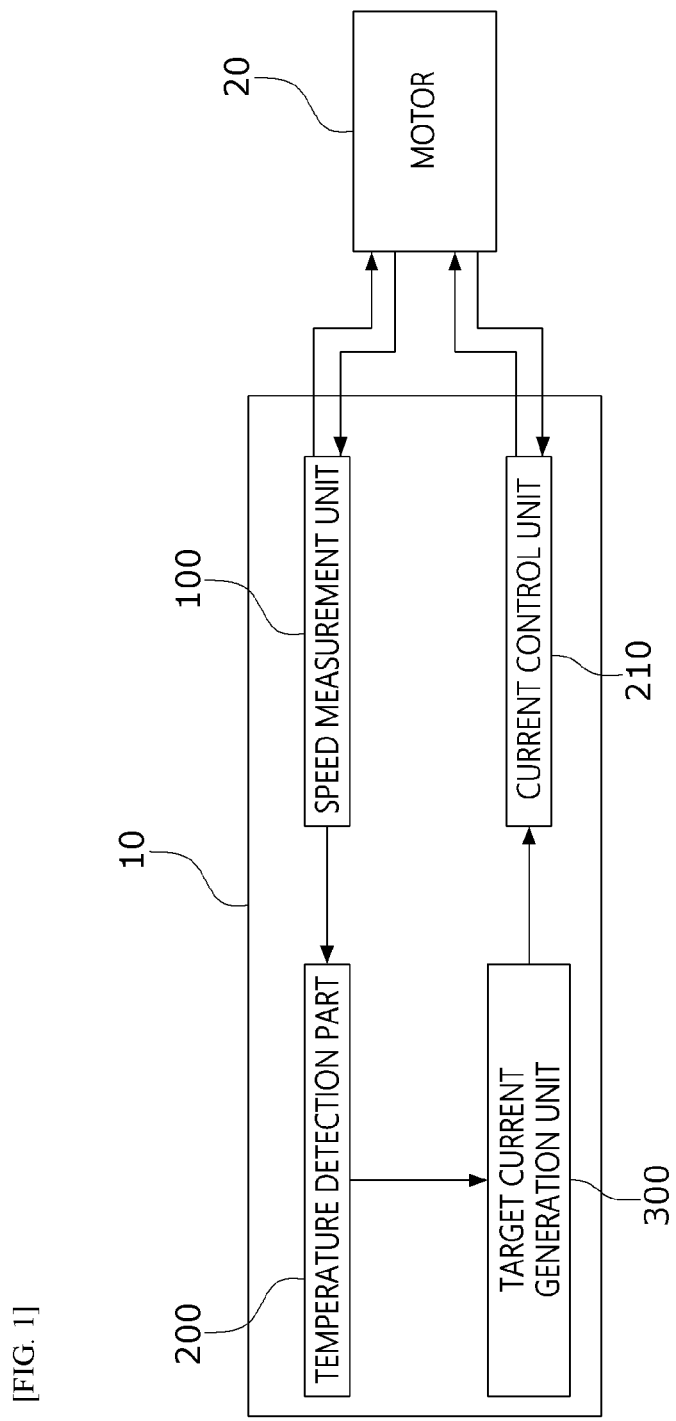
[FIG. 1]

[FIG. 2]
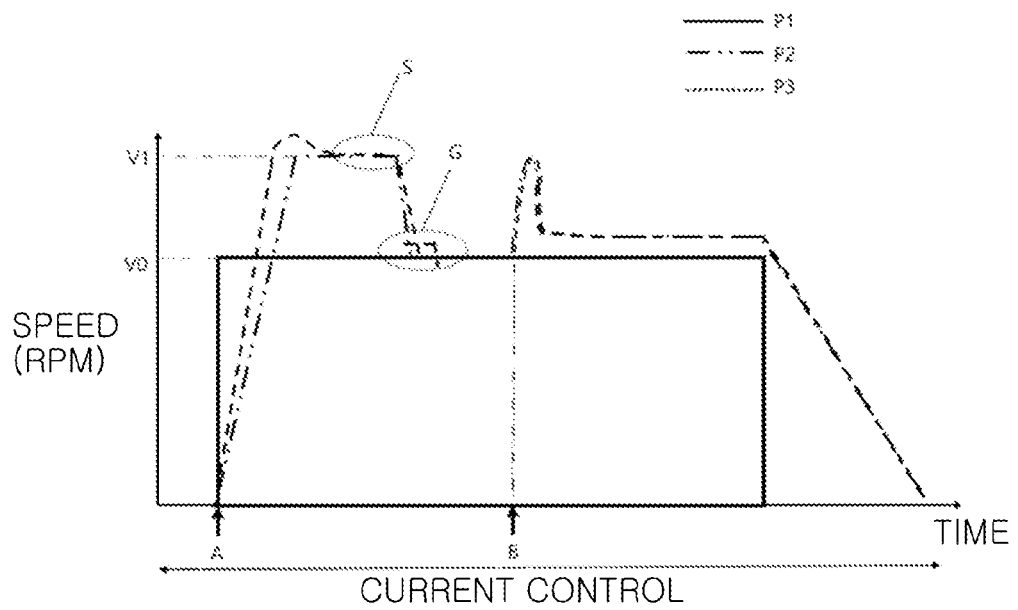

[FIG. 3]
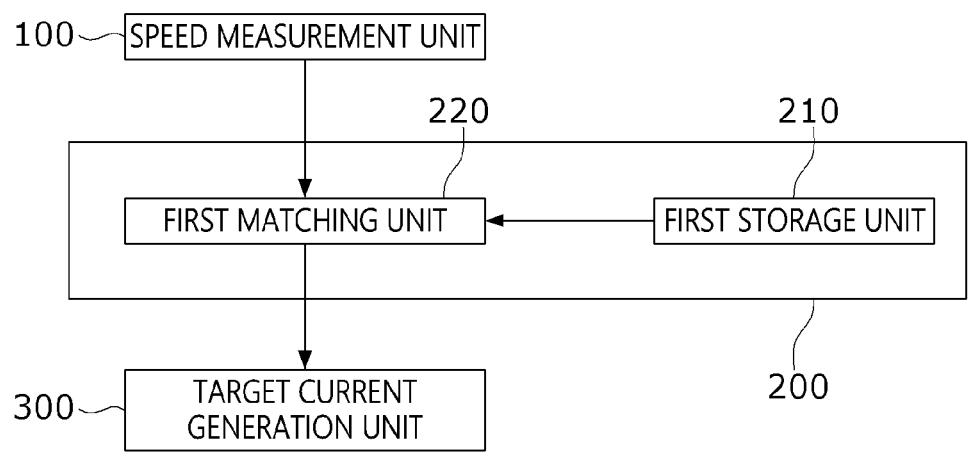

[FIG. 4]
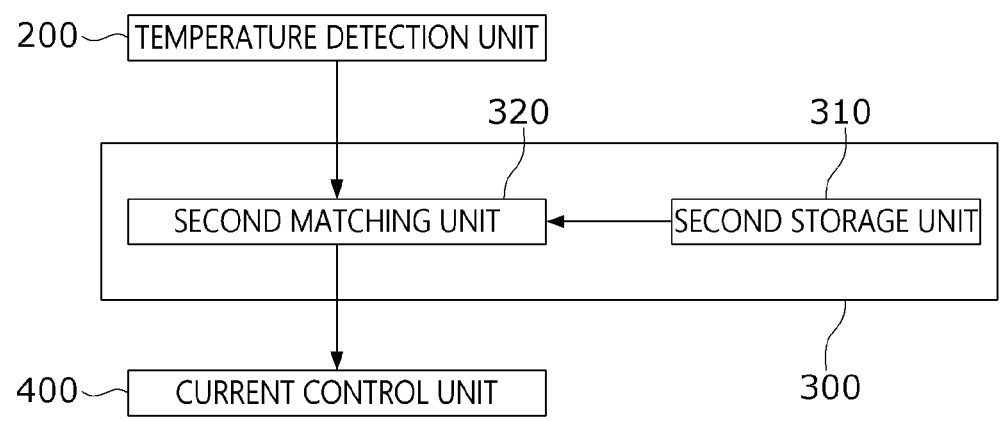

[FIG. 5]
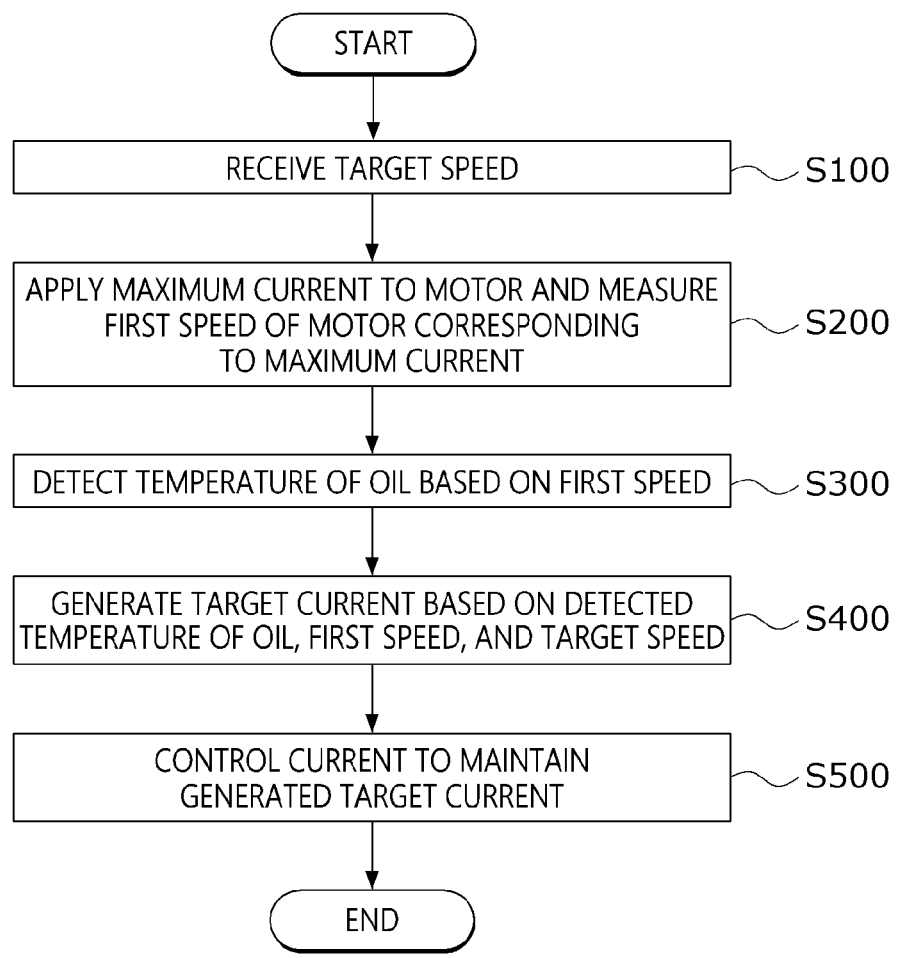

MOTOR

CROSS REFERENCE TO RELATED APPLICATIONS

This application is the National Phase of PCT International Application No. PCT/KR2021/011123, filed on Aug. 20, 2021, which claims priority under 35 U.S.C. 119 (a) to Patent Application No. 10-2020-0104744, filed in the Republic of Korea on Aug. 20, 2020, all of which are hereby expressly incorporated by reference into the present application.

TECHNICAL FIELD

The present invention relates to a motor.

BACKGROUND ART

Motors may be drive sources which supply oil to hydraulic lines in transmissions or braking systems which require oil circulation. A motor maintains a constant oil pressure, and when there is no pressure sensor, an oil pressure may be maintained by controlling a speed of the motor.

However, when characteristics of the oil, such as a viscosity of the oil, are changed as a time elapses, a design value error may occur in controlling the oil pressure.

In addition, while a vehicle is stopped, when an oil pump is switched from a mechanical oil pump to an electric oil pump, or when a gear is shifted from a D-stage to an N-stage, there is a problem that an oil pressure is quickly reduced.

DISCLOSURE

Technical Problem

Accordingly, the present invention is intended to address the problem and directed to providing a motor capable of maintaining a constant oil pressure even when characteristics of oil are changed, an oil pump is switched from a mechanical oil pump to an electric oil pump, or a gear is shifted from a D-stage to an N-stage.

Objectives to be achieved by the present invention are not limited to the above-described objective, and other objectives which are not described above will be clearly understood by those skilled in the art through the following descriptions.

Technical Solution

One aspect of the present invention provides a control device for a motor which supplies oil, the control device including a speed measurement unit which applies a maximum current to a motor to measure a first speed of the motor which corresponds to the maximum current, a temperature detection unit which detects a temperature of oil based on the first speed, a target current generation unit which generates a target current based on the detected temperature of the oil, the first speed, and a target speed, and a current control unit which controls a current to maintain the generated target current.

The temperature detection unit may include a first storage unit in which a speed of the motor corresponding to the maximum current is stored for each temperature of the oil and a first matching unit which is connected to the first storage unit and matches the temperature of the oil to the first speed.

The target current generation unit may include a second storage unit in which the target current for changing the first speed to the target speed is stored for each temperature of the oil and a second matching unit which is connected to the second storage unit and matches the target current to the detected temperature of the oil.

The first speed may be a speed of the motor in a normal state after the maximum current is applied.

The first speed may be greater than the target speed.

In a state in which the target current is maintained, after a first time point, a speed of the motor may be greater than the target speed.

The first time point may be a time point at which a transmission signal of a vehicle is input.

Another aspect of the present invention provides a method of controlling a motor which supplies oil, the method including operation a) of applying a maximum current to a motor and measuring a first speed, which corresponds to the maximum current, of the motor, operation b) of detecting a temperature of oil based on the first speed, operation c) of generating a target current based on the detected temperature of the oil, the first speed, and a target speed, and operation d) of controlling a current to maintain the generated target current.

In the operation c), the detected temperature of the oil may be matched with the target current for changing the first speed to the target speed.

The method may further include operation e) of receiving the target speed before the operation a).

Advantageous Effects

According to embodiments, there is an advantage of maintaining a constant oil pressure even when characteristics of oil are changed.

According to embodiments, there is an advantage of maintaining a constant oil pressure by changing a speed of a motor in a state in which a constant target current is maintained when an oil pump is switched from a mechanical oil pump to an electric oil pump, or a gear is shifted from a D-stage to an N-stage.

According to embodiments, there is an advantage of maintaining a constant oil pressure by controlling a speed of a motor even without a pressure sensor.

DESCRIPTION OF DRAWINGS

FIG. 1 is a block diagram illustrating a control device of a motor according to an embodiment of the present invention.

FIG. 2 is a graph showing a control profile.

FIG. 3 is a block diagram illustrating a temperature detection unit.

FIG. 4 is a block diagram illustrating a target current generation unit.

FIG. 5 is a flowchart of a method of controlling a motor according to an embodiment of the present invention.

MODES OF THE INVENTION

A motor, which will be described below, may include a pump part and a motor part, and the motor part may transmit power to the pump part. The pump part serves to receive the power from the motor part and pump oil. The pump part includes an inner rotor and an outer rotor and has a predetermined eccentric structure when the inner rotor rotates, a portion, of which a volume has increased during rotational movement, of the inner rotor suctions a surrounding fluid due to a decrease in pressure, and a portion, of which a volume has decreased, discharges a fluid due to an increase in pressure. The motor part may include a shaft, a rotor, and a stator.

A control device of the motor and a method of controlling the motor, which will be described below, are for generating a target current for maintaining a constant oil pressure of the pump part. When the constant target current is maintained, since a speed of the motor increases when an oil pressure decreases at a certain time point, a decreased oil pressure can be compensated for, and thus the constant oil pressure can be maintained.

In this case, the certain time point may be a time point at which an operation of a mechanical pump is switched to an operation of an electric pump in an idle stop & go (ISG) system of a vehicle, or a gear is shifted from a D-stage to an N-stage.

The control device and the method of controlling the motor, which will be described below, reflect present characteristics of the oil in generating such a target current.

FIG. 1 is a block diagram illustrating a control device of a motor according to an embodiment of the present invention, and FIG. 2 is a graph showing a control profile.

Referring to FIGS. 1 and 2, a control device 10 of the motor according to the embodiment may include a speed measurement unit 100, a temperature detection unit 200, a target current generation unit 300, and a current control unit 400.

The speed measurement unit 100 measures a first speed V1, which corresponds to a maximum current, of a motor 20.

Since the motor 20 according to the embodiment does not have a pressure sensor, the motor 20 has a feature of controlling a pressure through a signal that controls a speed of the motor 20. When an upper controller receives a target speed V0 of the motor 20, and operating conditions of the motor 20, for example, an operation of the ISG system or the like, are satisfied, the speed measurement unit 100 applies the maximum current to the motor 20 at a corresponding time point (a time point A of FIG. 2). This is to estimate a maximum speed of the motor 20, which corresponds to the maximum current, in order to check present characteristics of oil.

The target speed V0 of FIG. 2 is a value received from the upper controller, and a speed profile P2 of FIG. 2 shows preset values for controlling a constant oil pressure.

The first speed V1 is a speed of the motor 20 in a normal state S after applying the maximum current to the motor 20. That is, the first speed V1 corresponds to a speed at which an actually measured speed P3 of the motor 20 converges to the speed profile P2 after applying the maximum current to the motor 20. The speed profile P2 shows the preset speed values of the motor 20 in order to maintain the constant oil pressure over time after the motor 20 operates. The oil pressure may be mathematically calculated based on a current value for maintaining a speed of the speed profile P2. The target speed V0 is a value received from the upper controller. The first speed V1 is greater than the target speed V0.

Since a viscosity of the oil varies according to a temperature, it is important to measure a present temperature of the oil.

FIG. 3 is a block diagram illustrating the temperature detection unit 200.

Referring to FIG. 3, the temperature detection unit 200 may detect a present temperature of the oil based on the first speed V1. The temperature detection unit 200 is connected to the speed measurement unit 100 to receive the first speed V1. The temperature detection unit 200 may include a first storage unit 210 and a first matching unit 220. The first storage unit 210 may store a speed of the motor 20 corresponding to a maximum current for each temperature of the oil in the form of a look-up table. The speed of the motor 20 of the first storage unit 210 is a value stored in advance through an experiment and reflects characteristics of the oil and characteristics of the motor 20 for each temperature.

The first matching unit 220 matches a temperature of the oil to the first speed V1 received through the speed measurement unit 100. The matched temperature of the oil is transmitted to the target current generation unit 300.

FIG. 4 is a block diagram illustrating the target current generation unit 300.

Referring to FIGS. 2 and 4, the target current generation unit 300 may generate a target current based on a temperature of the oil detected by the temperature detection unit 200. The target current corresponds to a current which maintains the speed profile P2 and is a value which should be maintained constant during an operation of the motor 20. In a state in which the target current is maintained, after a first time point B (see FIG. 2), a speed of the motor 20 may be greater than the target speed V0. In this case, the first time point B may be a time point at which a gear is shifted from a D-stage to an N-stage.

The target current generation unit 300 is connected to the temperature detection unit 200 to receive a temperature of the oil. The target current generation unit 300 may include a second storage unit 310 and a second matching unit 320. The second storage unit 310 may store a target current for changing the first speed V1 to the target speed V0 for each temperature of the oil in the form of a look-up table. The target current is a value stored in advance through an experiment and reflects the characteristics of the oil and the characteristics of the motor 20 for each temperature.

The second matching unit 320 matches a temperature of the oil received through the temperature detection unit 200 and a target current corresponding to the target speed V0 received from the upper controller. The matched target current is transmitted to the current control unit 400.

The current control unit 400 controls a current to maintain the target current generated by the target current generation unit 300.

FIG. 5 is a flowchart of a method of controlling the motor 20 according to an embodiment of the present invention.

Referring to FIG. 5, the method of controlling the motor 20 according to the embodiment includes receiving a target speed V0 from the upper controller (S100) first.

Then, in a state in which the target speed V0 is received, when operating conditions of the motor 20, for example, an operation of the ISG system or the like, are satisfied, the speed measurement unit 100 applies a maximum current to the motor 20 to measure a first speed V1 of the motor 20 corresponding to a maximum current (S200).

Then, the temperature detection unit 200 receives the first speed V1 from the speed measurement unit 100 and detects a temperature of oil by matching a temperature of the oil corresponding to the received first speed V1 (S300).

Then, the target current generation unit 300 receives the detected temperature of the oil from the temperature detection unit 200, and generates a target current by matching the received temperature of the oil and a current for changing the first speed V1 to a target speed V0.

Then, the current control unit 400 controls a current to maintain the target current.

In the above-described embodiment, an example of the ISG system has been described as one of the operating conditions of the motor, but the present invention is not limited thereto and can be applied to various conditions in which a pressure of oil changes quickly. In addition, an example of the target speed received from the upper controller has been described, but the present invention is not limited thereto and can be applied to various control conditions in which the target speed is set.

The invention claimed is:

1. A control device for a motor which supplies oil, the control device comprising:
   a speed measurement unit which applies a maximum current to a motor to measure a first speed of the motor which corresponds to the maximum current;
   a temperature detection unit which detects a temperature of oil based on the first speed;
   a target current generation unit which generates a target current based on the detected temperature of the oil, the first speed, and a target speed; and
   a current control unit which controls a current to maintain the generated target current,
   wherein the first speed corresponds to a speed at which an actually measured speed of the motor converges to a speed profile after applying the maximum current to the motor and the speed profile shows preset speed values of the motor in order to maintain constant oil pressure over time after the motor operates,
   wherein the temperature detection unit includes:
      a first storage unit in which a speed of the motor corresponding to the maximum current is stored for each temperature of the oil; and
      a first matching unit which is connected to the first storage unit and matches the temperature of the oil to the first speed, and
   wherein the target current generation unit includes:
      a second storage unit in which the target current for changing the first speed to the target speed received from an upper controller is stored for each temperature of the oil; and
      a second matching unit which is connected to the second storage unit and matches the target current to the detected temperature of the oil.

2. The control device of claim 1, wherein, in a state in which the target current is maintained, after a first time point, a speed of the motor is greater than the target speed.

3. The control device of claim 2, wherein the first time point is a time point which an oil pump is switched from a mechanical oil pump to an electric oil pump.

4. The control device of claim 2, wherein the first time point is a time point at which a transmission signal of a vehicle is input.

5. The control device of claim 1, wherein the first speed is greater than the target speed.

6. A method of controlling a motor which supplies oil, the method comprising:
   operation a) of applying a maximum current to a motor and measuring a first speed of the motor which corresponds to the maximum current;
   operation b) of detecting a temperature of oil based on the first speed;
   operation c) of generating a target current based on the detected temperature of the oil, the first speed, and a target speed; and
   operation d) of controlling a current to maintain the generated target current,
   wherein the first speed corresponds to a speed at which an actually measured speed of the motor converges to a speed profile after applying the maximum current to the motor and the speed profile shows preset speed values of the motor in order to maintain constant oil pressure over time after the motor operates,
   wherein, in the operation c), connecting to a first storage unit in which a speed of the motor corresponding to the maximum current is stored for each temperature of the oil and matching the temperature of the oil to the first speed received from an upper controller before the operation a) and connecting to a second storage unit in which the target current for changing the first speed to the target speed is stored for each temperature of the oil and matching the target current to the detected temperature of the oil.

* * * * *